Nov. 3, 1936.   A. R. WURTELE   2,059,720
INTERNAL COMBUSTION ENGINE
Filed Aug. 13, 1932   2 Sheets-Sheet 1
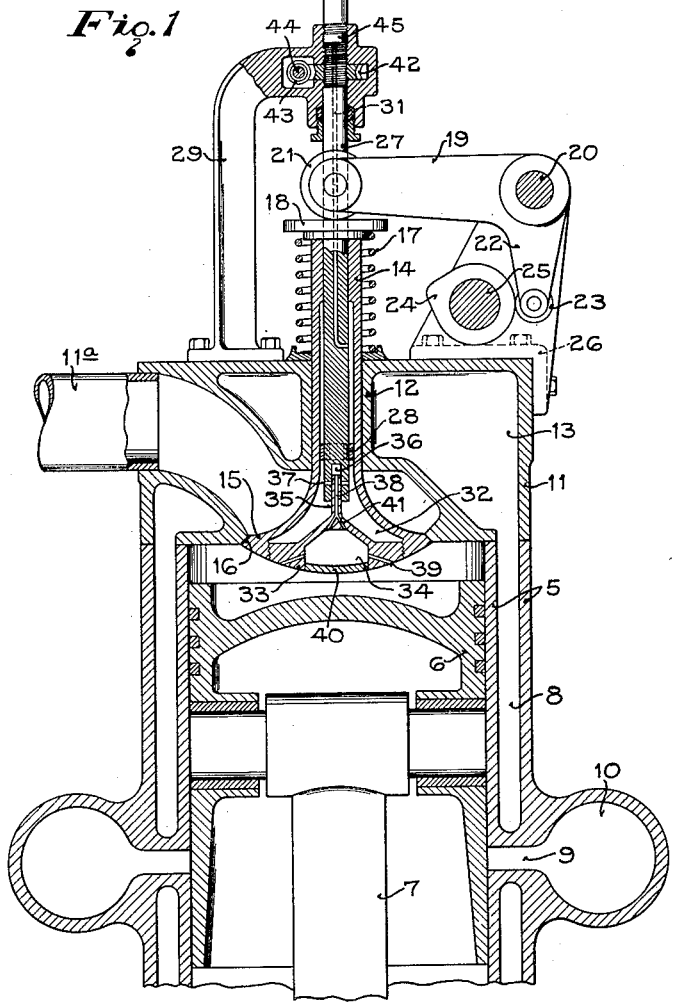
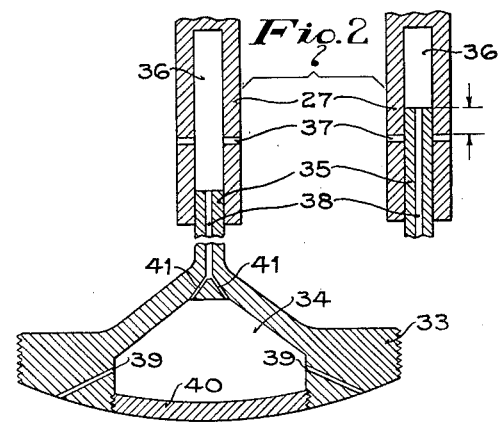
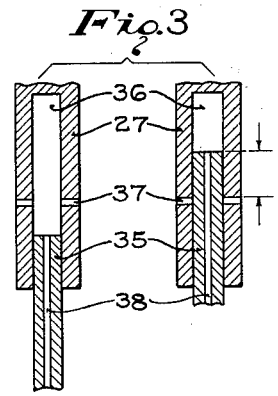
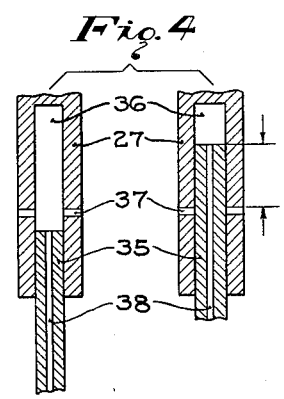
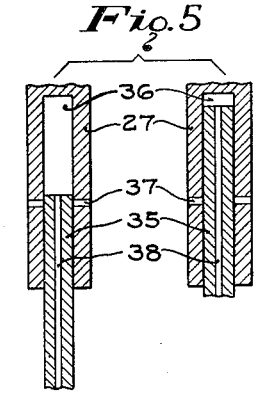
INVENTOR
Allan R Wurtele
BY
F. Bascom Smith
ATTORNEY Nov. 3, 1936.  A. R. WURTELE  2,059,720
INTERNAL COMBUSTION ENGINE
Filed Aug. 13, 1932   2 Sheets-Sheet 2
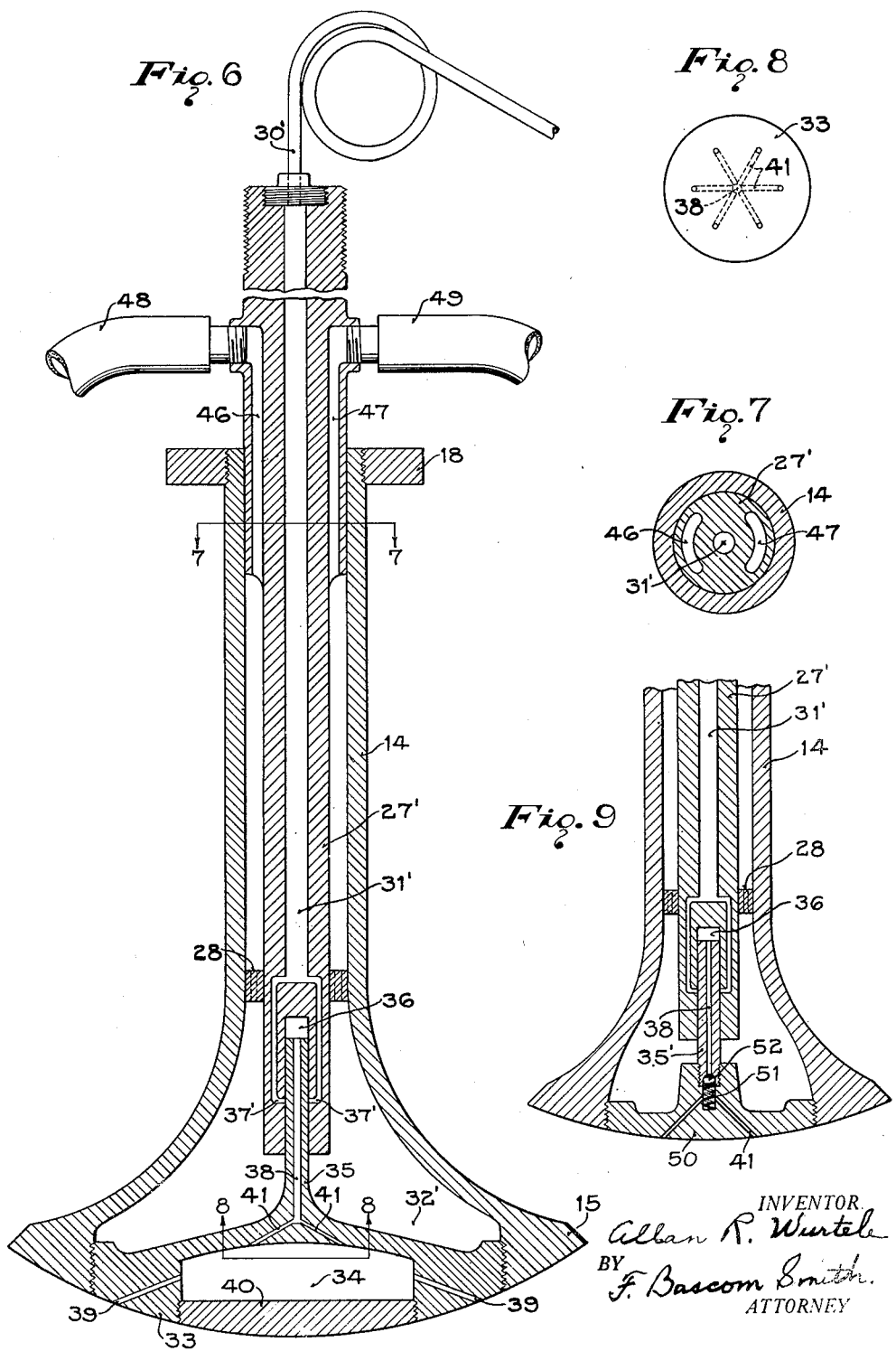

Patented Nov. 3, 1936

2,059,720

UNITED STATES PATENT OFFICE 2,059,720

INTERNAL COMBUSTION ENGINE

Allan R. Wurtele, New Roads, La.

Application August 13, 1932, Serial No. 628,647

26 Claims. (Cl. 123—32)

This invention relates to internal combustion engines, and more particularly to engines of the Diesel type.

It has heretofore been proposed to construct Diesel engines in such a manner that the engine fuel was fed into a cup or precombustion chamber by gravity on the suction stroke. When this fuel was ignited on the compression stroke, a sufficiently high pressure was built up in the precombustion chamber to drive the burning fuel out into the engine cylinder where combustion was completed. This type of engine was relatively simple and inexpensive but was subject to very definite speed limitations due to slow flame propagation, which was in turn due to lack of turbulence of the air charge and improper distribution of the fuel charge. A further difficulty was experienced in properly cooling the cups, which resulted in the orifices and walls of the cups becoming pitted or coated with carbon, thus impairing the efficiency and operation of the engine.

The objections inherent in the cup type engines are partially overcome in solid fuel injection engines wherein fuel is sprayed directly into the engine cylinder near the end of the compression stroke. While the speed range of such an engine is wider than that of the cup type, the high pressure fuel pump required is expensive, heavy and unreliable. Also, minute quantities of fuel must be injected into the cylinders at precisely the proper moment in order to obtain smooth and efficient operation. Due, however, to the compressibility of fuels, to the time lag in the pressure system and to expansion and contraction of long fuel lines, the timing of fuel injection varies to such an extent that efficiency is greatly reduced. Furthermore, high ignition pressures are necessitated, thus greatly increasing the bearing pressures on the running gear without a proportionate increase in power.

One of the objects of the present invention is to provide a novel engine of the Diesel type which is so constructed as to be capable of operation over a wide range of speeds, the fuel therefor being introduced at low pressures and without timing difficulties, whereby the above noted objections are fully overcome.

Another object of the invention is to provide a novel means for measuring, injecting and atomizing the fuel, whereby a smoothly running engine with a wide range of speeds is obtained.

Another object is to provide novel mechanism whereby fuel injected into the cylinder of an internal combustion engine is highly atomized and evenly distributed thereby reducing the ignition pressure, increasing the effective burning surface of the fuel, and speeding up flame propagation.

Still another object is to provide novel means for cushioning the closing action of a valve of an internal combustion engine.

A further object is to provide a novel fuel measuring and spraying pump in combination with a valve of an internal combustion engine.

A still further object is to provide novel means for cooling a precombustion chamber employed in internal combustion engines.

The above and further objects and novel features of the invention will more fully appear from the following detailed description when taken in connection with the accompanying drawings. It is to be expressly understood, however, that the drawings are for the purpose of illustration only and are not designed as a definition of the limits of the invention, reference being primarily had for this purpose to the appended claims.

In the drawings wherein like reference characters refer to like parts throughout the several views:

Fig. 1 is a side elevation, partly in section and with parts broken away, of a portion of an internal combustion engine of the two-cycle type embodying the present invention;

Fig. 2 is an enlarged scale sectional detail view, with parts broken away, of the fuel measuring pump and spraying nozzle employed in carrying out this invention, the piston being shown in two positions;

Figs. 3, 4 and 5 are sectional detail views, with parts broken away, showing the pump at open and closed positions of the valve for various running conditions of the engine;

Fig. 6 is a side elevation, partly in section and with parts broken away, showing a second embodiment of the invention;

Fig. 7 is a cross-sectional view taken on line 7—7 of Fig. 6;

Fig. 8 is a cross-sectional view taken on line 8—8 of Fig. 6; and

Fig. 9 is a sectional view, with parts broken away, of another form of the invention.

One embodiment of the novel fuel injection assembly comprehended by the present invention is illustrated in Fig. 1 of the accompanying drawings wherein the same is shown, by way of example, in combination with a portion of a two-cycle, Diesel type, internal combustion engine. The latter, in the form illustrated, comprises a cylinder 5 having a piston 6 and a connecting rod 7 mounted therein, said connecting rod being adapted to be connected to the engine crankshaft, not shown. The cylinder is surrounded by a suitable cooling water space 8 and is provided with a series of tangentially disposed ports 9 which are adapted to be covered and uncovered by piston 6 for establishing communication between said cylinder and an air manifold 10. A supply of air under pressure is maintained in the latter by means of a suitable blower or compressor (not shown) for scavenging the cylinder and supplying the same with air to support the combustion of the engine fuel as will be understood by those skilled in the art. Ports 9 are preferably disposed in such a manner as to impart a swirling motion to the air column in cylinder 5, the turbulence of the air insuring thorough scavenging and materially aiding rapid combustion.

A cylinder head 11 is secured in any suitable manner to cylinder 5 and, as shown, the same is provided with an exhaust port which is preferably coaxial with cylinder 5 and is connected with an exhaust pipe 11a. Head 11 is further provided with a valve guide 12 and a cooling water chamber 13 in direct communication with space 8, a maximum of the surface of guide 12 being in contact with the cooling medium to be circulated in chamber 13.

A novel exhaust valve is provided for covering the exhaust port in cylinder head 11 and, as illustrated, said valve consists of a hollow stem 14, having a sliding fit in guide 12, and a flared head portion 15 which is adapted to be seated upwardly against a suitable valve seat 16. Valve 14, 15 is normally held against seat 16 by means of a coil spring 17 which surrounds stem 14 and is interposed between cylinder head 11 and a cap 18 suitably secured to the upper end of stem 14. It will be noted that the valve may rotate in guide 12.

Any suitable means may be provided for opening valve 14, 15 and, in the form shown, such means are constituted by a bifurcated bell crank lever 19 pivoted on a shaft 20 and having rollers 21 on the bifurcated portion thereof which engage the upper surface of cap 18. The lower arm 22 of lever 19 carries on the free end thereof a roller 23 that rides on cam 24. The latter is secured to a cam shaft 25 driven by the engine crank shaft (not shown). Shafts 20 and 25 may be supported by a bracket 26 secured to cylinder head 11.

Novel means are provided within the hollow valve 14, 15 for supplying measured quantities of fuel to the engine cylinder and for properly distributing the same therein. In the form illustrated, such means comprise a spindle 27 which has a sliding fit in the upper reduced bore of valve stem 14. A perforated guide 28 may be interposed between valve stem 14 and the lower portion of spindle 27 if desired. A bracket 29 secured to cylinder head 11 adjustably supports spindle 27 in a manner to be described more fully hereafter. Fuel is supplied under a relatively small pressure, for example, twenty-five pounds per square inch, from a supply pipe 30 through a central passage 31 in spindle 27 to a chamber 32 formed by the inner walls of valve 14, 15, the outer surfaces of said spindle and a mushroom-shaped member 33. The latter member is threadedly mounted in valve head 15 and constitutes a portion thereof, the lower surface of said member and valve head forming a continuous convex surface.

In the form shown, member 33 is provided with a hollow center portion 34 constituting a precombustion chamber which communicates with power cylinder 5 and, at predetermined intervals, with fuel chamber 32. Extending upwardly from the head of member 33 is a hollow stem or piston 35 which extends into a cylindrical recess 36 constituting a fuel pump cylinder in the lower end of spindle 27. In operation, spindle 27 is normally stationary while piston 35 moves downwardly in cylinder 36 when valve 14, 15 is opened, whereupon said cylinder is placed in communication with chamber 32 through a series of radial ducts 37 provided in the walls of cylinder 36. During the closing movement of the valve, i. e., when piston 35 is moving upwardly, the fuel which was forced into cylinder 36 through ducts 37 by the pressure in supply pipe 30 is pumped through a central passage 38 in piston 35 into precombustion chamber 34 and subsequently into cylinder 5 through suitable orifices 39. Preferably, the central lower portion of member 33 is constituted by a removable disc 40 which may be secured to said member by any suitable means such as screw threads or welding.

Novel pumping means constituted by piston 35 and cylinder 36 are therefore provided within the hollow stem of a valve for pumping fuel under pressure into the precombustion chamber or, if desired, into the power cylinder of the engine. During the operation of the engine, spindle 27 and hence cylinder 36 are normally stationary and valve 14, 15 and piston 35 are reciprocated relative thereto by lever 19 and spring 17. Piston 35 thus reciprocates with a constant stroke in cylinder 36 and is effective on the up stroke, after ports 37 are covered thereby, to force a predetermined column of fuel, as indicated by the arrows in Figs. 2, 3 and 4, through passage 38 into precombustion chamber 34. It will be seen that when piston 35 is in its lower position, as shown in Figs. 2, 3 and 4, the pressure in chamber 32 is effective to fill cylinder 36 with fuel.

Preferably, passage 38 communicates with chamber 34 by means of a plurality of minute orifices 41 constituting a fuel spraying nozzle. As shown, orifices 41 are conically disposed in the base of piston 35 and serve a three-fold purpose, i. e., to cushion the closing movement of valve 14, 15, to break up and finely atomize the fuel, and to prevent the flame propagation in chamber 34 from extending to the fuel in passage 38 and cylinder 36.

The atomization and thorough distribution of the fuel in chamber 34, obtained by forcing the same through orifices 41, also serves a three-fold purpose. First, the latent heat of vaporization of the fuel is absorbed from the inner walls of chamber 34, thereby assisting in the cooling of the valve. Secondly, the fuel is thus pre-heated, thereby reducing the temperature required to ignite the same and hence reducing the ignition pressure required in the engine cylinder. Thirdly, the exposed burning surface of the fuel is materially increased, thereby speeding up flame propagation.

In order to obtain a wide range of speed, together with efficient operation, complete combustion of the fuel in the engine cylinder must be attained. To this end, novel means are provided for further atomizing the fuel in the precombustion chamber and for evenly distributing the same across the entire cross-section of the engine cylinder, whereby the maximum burning surface of the fuel is exposed to the combustion supporting air in said cylinder. Such means are constituted by the tangential or radial disposition of orifices 39 relative to chamber 34 and cylinder 5. On the compression stroke of the engine, the atomized fuel in chamber 34 is ignited, and the expanding gases create a sufficiently high pressure in said chamber to force the burning particles through orifices 39, thereby breaking up and properly distributing the same in cylinder 5.

It may be noted that the fuel in chamber 32 serves as an additional cooling medium for valve 14, 15, the hotter portion of the fuel, that is, that adjacent member 33, being the first to enter the injection pump 35, 36 through ducts 37. The heat transfer from valve 14, 15 and member 33 to the fuel serves also to pre-heat the latter.

In order that the speed of the engine may be controlled under various load conditions, novel means are provided for varying the charge or quantity of fuel injected into the engine cylinder for each power stroke of the engine piston. The method of control, in the form shown, consists in moving cylinder 36 vertically, thereby regulating the effective pumping stroke of plunger 35, i. e., the stroke of said plunger above ports 37 as indicated by arrows in Figs. 2, 3 and 4. Preferably, the means provided for actuating spindle 27 are constituted by an annular rack 42 which is threaded on the upper end of said spindle and which meshes exteriorly with a worm 43 secured to a manually operable shaft 44. The latter is rotatably supported, and rack 42 is held in a fixed vertical position, by bracket 29. Thus, when rack 42 is actuated by turning worm 43, spindle 27 is moved up or down depending on the direction of rotation of said worm, and the extent of the piston stroke above ducts 37 is thereby varied (Figs. 2 to 5, inclusive).

As pointed out above, fuel oil is supplied to passage 31 from supply pipe 30 and, as shown in Fig. 1, the latter is threaded into the upper portion of an opening 45 in bracket 29 concentric with rack 42. Spindle 27 has a fuel tight sliding fit in said opening. The fuel thus supplied is preferably maintained under a relatively small pressure of thirty pounds per square inch, for example, for forcing the same through ports 37 up into cylinder 36.

A cycle of operation is as follows:

With piston 6 at the top of its stroke, exhaust valve 14, 15 is held against seat 16 by means of spring 17 so that piston 35 is also at the top of its stroke, thereby covering ducts 37 and shutting off communication between cylinder 36 and chamber 32 as seen in Fig. 1. The latter is maintained full of fuel under pressure due to the fact that it is in constant communication with pipe 30 through passage 31. As piston 6 moves downward in cylinder 5, the lobe of cam 24 comes into contact with roller 23, thus swinging lever 19 in a counter-clockwise direction, moving valve 14, 15 downwardly against the pressure of spring 17, and opening the exhaust port in cylinder head 11.

While the exhaust port is open, piston 6 descends to a position below scavenging ports 9, and air under pressure rushes in, creating a turbulent, swirling air column in cylinder 5 to force the burned gases out of the latter. At the same time, piston 35 moves downwardly with valve 14, 15, uncovering ducts 37 and permitting fuel to rush through the same from chamber 32 to fill cylinder 36. When roller 23 has ridden over the top of the lobe on cam 24, spring 17 becomes effective to move valve 14, 15 upwardly toward closed position, piston 35 moving upwardly, also, in cylinder 36. As soon as piston 35 has covered ducts 37, the fuel is forced through passage 38 and orifices 41 into precombustion chamber 34, said fuel being highly atomized in passing through said orifices. The resistance to the flow of fuel offered by orifices 41 creates a dash-pot action which serves to cushion the closure of valve 14, 15, thereby preventing the same from slamming.

Preferably, cam 24 is set such that valve 14, 15 will close before ports 9 are covered by piston 6 on its up stroke, so that cylinder 5 will be filled with a turbulent column of air under pressure at the beginning of the compression stroke, thus increasing the quantity of oxygen in the cylinder for supporting combustion. The final compression pressure is thereby raised and hence the rate of flame propagation is increased. As piston 6 nears the top of its stroke, the fuel in precombustion chamber 34 is ignited. When the expansion of gases in chamber 34, due to initial combustion of the fuel, raises the pressure therein above the pressure in cylinder 5, the burning fuel particles are driven out through orifices 39 into the cylinder where combustion is rapidly completed.

By permitting combustion to begin in the precombustion chamber where the pressure is somewhat less than in the cylinder, less heat is required to ignite the fuel and hence a lower ignition pressure may be employed. Piston 6 is driven downwardly by the expanding gases, and the cycle is repeated. Due to the multiplicity and arrangement of orifices 39, a thorough and even distribution of the fuel in cylinder 5 is obtained and hence more rapid combustion. The fact that the fuel is highly atomized in passing through orifices 41 and 39 insures complete and rapid combustion. It may be noted that the explosion and compression pressures in chamber 34 will prevent any excess fuel from dripping out of orifices 41.

To regulate the speed of the engine under various load conditions, spindle 27 is adjusted by turning control shaft 44 by any suitable means such as a hand crank or wheel, not shown. The positions of spindle 27 relative to piston 35 at open and closed positions of valve 14, 15, for light, half and full load conditions are shown in Figs. 2, 3 and 4, respectively. It will be noted that the volume of fuel pumped into chamber 34 during each revolution of the engine is equal to the volume in cylinder 36 above ducts 37 which is displaced by piston 35 when valve 14, 15 is in closed position as indicated by the arrows. In other words, the greater the clearance volume above piston 35 at closed position of the valve, the less the fuel pumped into chamber 34. If it is desired to stop the engine, spindle 27 is moved downwardly to such an extent that piston 35 covers ducts 37 even when valve 14, 15 is in open position as shown in Fig. 5, thus preventing any fuel entering cylinder 36.

A second embodiment of the invention, which may be preferable for large sized valves in which extensive cooling is required, is shown in Fig. 6. As illustrated, this embodiment is so constructed that a cooling medium, such as water, is circulated in chamber 32' and fuel is delivered directly from pipe 30' to cylinder 36 through a passage 31' in spindle 27', which passage communicates with said cylinder at points 37' corresponding to ducts 37. The cooling medium is introduced into, and discharged from, chamber 32' by means of passages 46 and 47, respectively, in the upper enlarged portion of spindle 27', and said passages may be connected to the engine cooling system by means of flexible hose connections 48 and 49. Spindle 27' is provided with a threaded recess at its upper end for receiving pipe 30', the latter being coiled to permit the required vertical movement of the spindle.

The embodiment of the invention illustrated in Fig. 9 is particularly adapted for supplying a vaporizing fuel directly into the engine cylinder. As shown, the precombustion chamber is eliminated and a member 50, having the orifices 41 therein, is secured to the head of the valve 14, 15. If desired, a suitable check valve, for example, a ball 52 and spring 51, may be interposed between orifices 41 and passage 38 to insure against dripping of fuel into the cylinder. If a valve of this character is employed, piston 35' is preferably formed separately from member 50 and may be secured thereto as by means of screw threads. The check valve is so constructed that the fuel supply pressure in passage 31 or 31', which pressure in certain installations may be ten pounds per square inch, for example, will not unseat the valve.

There is thus provided a novel fuel injection mechanism for internal combustion engines adapted to be mounted within a valve of said engine. The novel construction of the valve and fuel injection assembly is of a simple, rugged and compact nature, thereby reducing the possibilities of failure, as well as the costs of manufacture. A plurality of cooling means are also provided for maintaining a valve and precombustion chamber at a desirable temperature, thereby insuring long life and efficient operation of the same. Due to the rapid flame propagation and completeness of fuel combustion attained by use of the novel mechanism herein provided, and due to the fact that a high pressure oil pump may be dispensed with, the weight and size of the engine is materially reduced for a given horsepower output and hence the field of use of this type of engine is expanded. A novel fuel pump has also been provided in close proximity with the cylinder into which it injects fuel, thereby eliminating the difficulties encountered with delicate and elaborate high pressure fuel injection systems heretofore used on some engines of the Diesel type. A fine degree of speed control is also attained by means of the mechanism provided by this invention.

While there has been shown and described only two embodiments of the invention, it is to be expressly understood that the same is not limited thereto but may be embodied in various other forms. For example, it is to be understood that even though only one cylinder of an engine has been illustrated, the invention is applicable to multi-cylinder engines, in which case the cam shaft 25 and speed control shaft 44 may be common to all cylinders. It is further pointed out that certain features of the invention are applicable to four-cycle as well as to the two-cycle engines; nor is the invention limited to an exhaust valve, as will be understood by those skilled in the art. Various other changes may be made in the design and arrangement of the parts illustrated without departing from the invention, and reference will primarily be had to the appended claims for a definition of the limits of the invention.

What is claimed is:

1. In an internal combustion engine, a power cylinder having a port, a valve for said port having a precombustion chamber in the head thereof, and means for injecting a fuel into said chamber, said means including a normally stationary cylinder and a piston therein movable with said valve.

2. Fuel supplying means for an internal combustion engine comprising, in combination with a power cylinder having a port, a tubular valve having an enlarged head for said port, a piston carried by said valve head, a fuel nozzle in said piston, a normally stationary cylinder for receiving said piston, the latter being adapted to force fuel under pressure from said cylinder through said nozzle, means for reciprocating said valve and piston, and means for supplying fuel to said last named cylinder.

3. In an internal combustion engine, a power cylinder having a port, a tubular valve having an enlarged head for said port, a piston carried by said valve head, an engine fuel supply nozzle in said piston, a normally stationary cylinder for receiving said piston, means for reciprocating said valve, means for supplying fuel to said last named cylinder, and means for adjusting the position of said last named cylinder for regulating the quantity of fuel delivered by said nozzle during each stroke of said piston.

4. In an internal combustion engine, a power cylinder having a port, a tubular valve having an enlarged head for said port, said valve head having a precombustion chamber therein, and said chamber having a plurality of ducts connecting it with said power cylinder, a piston carried by said valve head, a nozzle in said piston communicating with said chamber, a normally stationary cylinder for receiving said piston, the latter being adapted to force fuel under pressure from said cylinder through said nozzle, means for reciprocating said valve, and means for supplying fuel to said last named cylinder after each stroke of said piston.

5. In apparatus of the class described, a valve having a fuel passage therein, fuel pumping means actuated by the movements of said valve and disposed coaxially of the latter for delivering fuel through said passage, said pumping means including a piston movable with said valve, and a check valve interposed in said passage.

6. In an internal combustion engine, a power cylinder having a port, a valve for said port having a tubular stem and an enlarged head, a fuel injection nozzle adapted to spray fuel into a chamber in said valve head, and a pump within said stem for delivering fuel to said nozzle, said pump being adapted to be actuated by the movements of said valve.

7. In an internal combustion engine, a power cylinder having a port, a valve for said port having a precombustion chamber in the head thereof, a fuel spraying nozzle communicating with said chamber, and pump means comprising a normally stationary cylinder, and a piston movable with said valve, for pumping fuel through said nozzle.

8. In an internal combustion engine, a power cylinder having an exhaust port, a valve for said port having a precombustion chamber in the head thereof, a fuel spraying nozzle communicating with said chamber, pump means including a normally stationary cylinder for pumping fuel through said nozzle, means for supplying a fuel to said last named cylinder, and means for moving said cylinder for varying the length of the effective pumping stroke of said pump means.

9. In an internal combustion engine, a power cylinder having a port, a valve for said port, means for opening said valve, means for closing said valve, and means for yieldingly resisting said last named means including a stationary cylinder containing a fluid and a piston therein movable with said valve.

10. In apparatus of the class described, a valve, means for mounting said valve for free angular movement about the longitudinal axis thereof, fuel pumping means enclosed in said valve, said pumping means including a piston actuated by said valve, and means for supplying fuel to said pumping means.

11. In apparatus of the class described, a movable valve, fuel pumping means within said valve, said pumping means being actuated by the movements of said valve and including a piston rigidly connected to the head of said valve, and fuel supply means operatively connected to said pumping means.

12. In an internal combustion engine, a power cylinder having a port, a valve for said port having a tubular stem and a flared head portion, a fuel injection nozzle in said stem and movable therewith, means within said stem for pumping fuel to said nozzle, said last named means being actuated by the opening and closing movement of said valve, and manual means for controlling the quantity of fuel delivered to said nozzle during each revolution of the engine.

13. In an internal combustion engine, a power cylinder having an air inlet port, means for opening and closing said port, a head for said cylinder having a port therein, a valve for said port, means in said valve for delivering fuel to said power cylinder including a normally stationary cylinder and a piston therein movable with said valve, and means for adjusting the position of the last named cylinder to vary the size of the fuel charge delivered to the power cylinder.

14. In an internal combustion engine, a power cylinder having a port, a valve for said port having a free angular movement therein, means for reciprocating said valve for opening and closing said port, means within said valve and adapted to be actuated thereby for supplying fuel under pressure to said engine, and means for adjusting said last named means to regulate the quantity of fuel delivered to the engine.

15. In an internal combustion engine, a power cylinder having a port, a valve for said port, means for reciprocating said valve to open and close said port, said valve having a precombustion chamber in the head thereof, a spraying nozzle in communication with said chamber, and means within said valve and adapted to be actuated thereby for delivering a predetermined quantity of fuel under pressure to said nozzle during each revolution of the engine.

16. In an internal combustion engine, a power cylinder having ports in the walls thereof, means for supplying air under pressure to said ports, a piston in said cylinder adapted to open and close said ports, a head for said cylinder having a port therein, a valve for said port having a precombustion chamber, and pump means within said valve and including an element movable therewith for supplying a fuel under pressure to said chamber.

17. In an internal combustion engine, a power cylinder having air inlet ports, means for opening and closing said ports, a head for said cylinder having a port therein, a valve for said port having a chamber in the head thereof communicating with said cylinder, means for injecting a fuel into said chamber, said means including a normally stationary cylinder and a piston therein movable with said valve, and means for adjusting the position of said last named cylinder to vary the size of the charge injected into said chamber.

18. In an internal combustion engine, a power cylinder having a port, a valve for said port comprising a hollow stem and an enlarged head portion, a precombustion chamber in said valve head, pump means including a spindle slidably extending into said valve stem for delivering fuel to said chamber, the outer surface of a portion of said spindle and the inner walls of said valve forming a chamber for circulation of a cooling medium, and means for conducting a cooling medium to and from said last named chamber.

19. In an internal combustion engine, a power cylinder having a port, a piston in said cylinder, a valve for said port having a precombustion chamber in the head thereof in communication with said power cylinder by means of a plurality of ducts for delivering a fuel to said cylinder, said ducts being disposed at substantially right angles to the axis of said cylinder and so located as to distribute the fuel circumferentially around the bore of the cylinder, and at an appreciable distance from the principal axis thereof, whereby burning of the piston crown is avoided, and means including pump means actuated by the valve for supplying fuel to said chamber.

20. In an internal combustion engine, a power cylinder having a plurality of air inlet ports in the wall thereof, means for opening and closing said ports, a head for said cylinder having an exhaust port therein, a valve for said exhaust port having a plurality of ducts therein for delivering fuel to said cylinder, certain of said ducts being disposed at substantially right angles to the axis of said cylinder and so located as to distribute fuel circumferentially around the bore of the cylinder and at an appreciable distance from the principal axis thereof, and a pump actuated by the valve for delivering fuel to the ducts.

21. In an internal combustion engine, a power cylinder having a plurality of air inlet ports in the wall thereof, means for opening and closing said ports, a head for said cylinder having an exhaust port therein, a valve for said exhaust port having a precombustion chamber in the head thereof in communication with the power cylinder through a plurality of fuel ducts, said ducts being disposed substantially radially of the cylinder and so located as to distribute fuel circumferentially around the bore of the cylinder and at an appreciable distance from the principal axis thereof, and means actuated by said valve for pumping fuel into said precombustion cylinder.

22. In an internal combustion engine, a power cylinder, a head therefor having a port therein, a valve for said port, said valve having a cooling space therein, means for reciprocating said valve, the latter being adapted for free angular movement relative to said head, and means including inlet and outlet connections exterior of said head for circulating a cooling medium through said space.

23. In apparatus of the class described, a power cylinder having a port therein, a valve for opening and closing said port, said valve having a hollow stem and an enlarged head portion, pump means including a spindle slidably extending into said valve stem for pumping fuel under pressure through the valve to the cylinder, the outer surface of a portion of the spindle and the inner walls of said valve forming a chamber therein, and means for introducing a fluid into said chamber.

24. In an internal combustion engine, a power cylinder having a port, a valve for said port having a chamber therein, an atomizing nozzle communicating with said chamber, and means for supplying a liquid to said atomizing nozzle under pressure including a coaxially disposed piston and a coaxially disposed element movable independently of said piston and adapted to cooperate therewith for varying the effective pumping stroke thereof.

25. In an internal combustion engine, a power cylinder having a port, a valve for said port, and means for injecting a fuel through said valve into said cylinder, said means including a normally stationary cylinder and a piston therein movable with said valve.

26. In an internal combustion engine, a power cylinder having ports in the walls thereof, means for supplying air to the cylinder through said ports, a piston in said cylinder adapted to open and close said ports, a head for said cylinder having a port therein, a valve for said port, and pump means within said valve and including an element movable therewith for supplying a fuel under pressure to said cylinder.

ALLAN R. WURTELE.